US011577729B2

(12) United States Patent
Mielenz

(10) Patent No.: US 11,577,729 B2
(45) Date of Patent: Feb. 14, 2023

(54) METHOD FOR DRIVING ON AN OPPOSITE LANE IN A CONTROLLED MANNER

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

(*) Notice: Subject to any disclaimer, the term of this patent is extended or adjusted under 35 U.S.C. 154(b) by 182 days.

(21) Appl. No.: 16/850,182

(22) Filed: Apr. 16, 2020

(65) Prior Publication Data

US 2020/0339126 A1    Oct. 29, 2020

(30) Foreign Application Priority Data

Apr. 25, 2019   (DE) .......................... 10 2019 205 957

(51) Int. Cl.
| | | |
|---|---|---|
| *B60Q 1/24* | (2006.01) | |
| *B60W 30/08* | (2012.01) | |
| *B60W 30/095* | (2012.01) | |
| *B60W 30/18* | (2012.01) | |
| *B60W 60/00* | (2020.01) | |
| *G05D 1/02* | (2020.01) | |
| *G08G 1/16* | (2006.01) | |

(52) U.S. Cl.
CPC ......... *B60W 30/18163* (2013.01); *B60Q 1/24* (2013.01); *G05D 1/0212* (2013.01)

(58) Field of Classification Search
CPC ....... B60W 30/18163; B60W 30/0956; B60W 60/0015; B60W 30/08; B60W 2420/42; B60W 2420/52; B60W 2554/40; B60W 2720/10; B60Q 1/24; B60Q 2400/50; G05D 1/0212; G05D 1/166

USPC .......................................................... 701/25
See application file for complete search history.

(56) References Cited

U.S. PATENT DOCUMENTS

| | | | | |
|---|---|---|---|---|
| 2015/0353094 | A1* | 12/2015 | Harda ............. | B60W 30/18163 701/23 |
| 2016/0335892 | A1* | 11/2016 | Okada .................... | G08G 1/123 |
| 2020/0331466 | A1* | 10/2020 | Ohmura ............ | B60W 30/0956 |

FOREIGN PATENT DOCUMENTS

| | | | |
|---|---|---|---|
| DE | 10 2009 009 473 A1 | 8/2010 | |
| DE | 10 2009 046 497 A1 | 5/2011 | |
| DE | 10 2011 115 421 A1 | 4/2013 | |
| DE | 10 2016 201 190 A1 | 7/2017 | |
| DE | 102016201190 A1 * | 7/2017 | .......... B60W 30/045 |

(Continued)

*Primary Examiner* — Abby Y Lin
*Assistant Examiner* — Hossam M Abd El Latif
(74) *Attorney, Agent, or Firm* — Maginot, Moore & Beck LLP

(57) ABSTRACT

A method for driving a vehicle on an opposite lane in a controlled manner includes detecting, with a surroundings sensor system, surroundings of the vehicle and receiving, with a control device, measurement data of the surroundings sensor system. The method includes identifying at least one course of a road, and at least one course of at least one road user in the surroundings based on the received measurement data and planning a trajectory of the vehicle within the at least one course of a road. The method further includes identifying a section of the road wherein when driving on the section of road the opposite lane is cut across by the vehicle, and determining a first stop position for the vehicle prior to entering the identified section of road. The method then checks whether the opposite lane can be driven on in the identified section.

13 Claims, 4 Drawing Sheets

(56) References Cited

FOREIGN PATENT DOCUMENTS

DE    10 2017 215 316  A1    3/2019

\* cited by examiner

METHOD FOR DRIVING ON AN OPPOSITE LANE IN A CONTROLLED MANNER

This application claims priority under 35 U.S.C. § 119 to patent application no. 10 2019 205 957.0 filed on Apr. 25, 2019 in Germany, the disclosure of which is incorporated herein by reference in its entirety.

The present disclosure relates to a method for a vehicle driving on an opposite lane in a controlled manner. Furthermore, the present disclosure relates to a control device, a computer program as well as a machine-readable storage medium.

BACKGROUND

Different methods for automatically operating vehicles are already known. In particular, the longitudinal and transverse guide control of the vehicles is used in such methods, which is based on a so-called middle of the lane control. For this purpose, the vehicle is controlled in the center of a lane by means of the vehicle control system.

In the case of vehicles having larger dimensions, such as trucks or buses, cutting across the opposite lane may be unavoidable when driving round tight bends. A driving maneuver of this type can in particular lead to gridlock at blind sections of the road, as the vehicle does not check, prior to driving onto the section of road, whether the opposite lane can be freely driven through throughout the entire maneuver ahead.

In particular in the case of an increased volume of traffic, such gridlock may arise if subsequent road users tailgate and impair the ability to maneuver of the maneuvering vehicle.

SUMMARY

The aim of the disclosure can be seen in proposing a method and a control device for safely carrying out driving maneuvers, in which an opposite lane is blocked.

This aim is achieved by means of the respective object of the disclosure.

According to one aspect of the disclosure, a method for a vehicle driving on an opposite lane in a controlled manner, in particular at blind sections of road, is provided.

The surroundings of the vehicle are detected by a surroundings sensor system and the measurement data of the surroundings sensor system are received by a control device.

The control device identifies courses of the road and other road users in the surroundings of the vehicle based on the received measurement data. The measurement data determined by the surroundings sensor system can be used for trajectory planning of the vehicle. Alternatively, or in addition, the measurement data can be provided by other vehicles, infrastructure units and/or external server units. Furthermore, the trajectory planning can alternatively or in addition be carried out by a further control unit of the vehicle or externally to the vehicle by a server unit, wherein the planned trajectory is provided to the vehicle via a communication link.

A section of road is detected by the control device, wherein when driving on the section of road the opposite lane is cut across by the vehicle. A stop position of the vehicle prior to entering the detected section of road is determined and it is checked whether the opposite lane can be driven on unobstructed.

According to a further aspect of the disclosure, a control device is provided, wherein the control device is designed to carry out the method. The control device can preferably be a control device within the vehicle. Alternatively, or in addition, the control device can be configured as a vehicle-external server unit or in the form of a Cloud technology. The control device can also be designed as a component or as a module of a vehicle control system for automated driving.

Moreover, according to one aspect of the disclosure, a computer program is provided. The computer program comprises commands, which when the computer program is run by means of a control device cause the control device to carry out the method. According to a further aspect of the disclosure, a machine-readable storage medium is provided, on which the computer program is stored.

According to the Federal Highway Research Institute (BASt) definition, the vehicle can preferably be operable in an assisted, partly automated, highly automated and/or fully automated or driverless manner. The vehicle can have a vehicle control system for this purpose, which can access the surroundings sensor system and the actuators for driving, accelerating and decelerating the vehicle.

The vehicle can in particular have dimensions which exceed the dimensions of a regular passenger vehicle. The vehicle can be designed as a bus, truck, semi-trailer, tanker, commercial vehicle, agricultural vehicle, trailer and the like.

As a result of the method and the control device, traffic conditions lying ahead of the vehicle which require cutting across into oncoming traffic can be safely and comfortably navigated. Gridlock involving oncoming traffic which has the right of way can thereby be prevented. Furthermore, the flow of traffic at such sections of road can be maintained. By preventing gridlock, unpleasant situations for passengers can also be avoided and comfort enhanced.

According to one exemplary embodiment, the vehicle is stopped or slowed down at or before the stop position, wherein the course of road behind and/or in the region of the blind section of road is checked for oncoming road users by means of evaluating the measurement data. When determining oncoming road users, the vehicle is slowed down or stopped by means of the control device.

The stop position of the vehicle can be a position before driving round the bend or driving on the section of road, in the case of which an opposite lane for the oncoming traffic can be cleared unobstructed. The stop position can be provided depending on the situation with a safety distance. According to an alternative or additional embodiment, the stop position can be selected in such a manner that the vehicle slightly enters the opposite lane at least in part, in order to obtain an optimum assessment of the traffic conditions of the section of road.

Prior to determining the stop position, the area that the vehicle is expected to drive over can be calculated. This region can be calculated by means of the control device based on the dynamic and static variables, such as turning radius, turning time, length and width of the vehicle and the like.

The area driven over by the vehicle in the section of road can be compared with the course of the lane of the vehicle. A region on the opposite lane which the vehicle slightly enters can thereby be determined. In particular, a point can thus be determined at which the opposite lane is used by the vehicle. Based on this point, the stop position can be selected in the longitudinal direction of the road.

According to a further exemplary embodiment, a necessary period of time for the vehicle to drive through the blind section of road is determined. According to a further embodiment, it is checked for the necessary period of time to drive through the blind section of road whether an oncoming road user is driving on the section of road.

The period of time can in particular be a period of time which starts with the vehicle driving on the opposite lane and ends when it has completely left the opposite lane.

The surroundings sensor system can be used to determine road users of the oncoming traffic with corresponding movement vectors. The movement vectors can be used for a prediction of the expected behavior of the oncoming traffic. It can subsequently be checked whether the vehicle can drive on the opposite lane without endangering the oncoming traffic.

In order to carry out the method, in particular dynamic objects can be identified and associated with the lanes based on measurement data of the surroundings sensor system. Furthermore, algorithms for classifying the dynamic objects can be used for applying type-specific prediction models.

According to a further embodiment, driving on the section of road is initiated if no oncoming road user is driving on the section of road during the period of time, wherein the vehicle slightly enters the opposite lane along a region when driving on the blind section of road.

For this purpose, road users of the oncoming traffic can be detected and their expected arrival at the section of road estimated. The time taken to reach the oncoming traffic can be compared with the time required to clear the section of road and the further course of the vehicle can be initiated. The further course can, for example, be configured by adapting the vehicle speed, by stopping or by continuing the journey. It can thereby be enabled to safely drive through the section of road.

According to a further exemplary embodiment, a stop position for the oncoming road user is determined when an oncoming road user has been determined. The stop position of the oncoming road user is preferably located at an end of the section of road opposite the vehicle. The vehicle takes up a region of the opposite lane when driving on the section of road, in order to be able to successfully clear the section of road. The stop position of the oncoming road user can thus be determined in such a manner that the vehicle can slightly enter the opposite lane unobstructed when driving on the section of road. According to a further embodiment, the stop position is indicated to the oncoming road user. The oncoming traffic can thereby be instructed to stop prior to driving on the section of road. The indication can be given by means of a wireless communication link, such as a car-to-car communication link, or by means of visual signals. By means of indicating the stop position to the oncoming road user, the automated vehicle can complete its maneuver, namely driving on the section of road, in a controlled manner, as the opposite lane of the section of road is at least partially kept clear of oncoming traffic.

According to a further embodiment, the stop position is indicated to the oncoming road user in the form of a visual marker. For this purpose, the vehicle can have a signaling device for producing a projection. The signaling device can preferably produce a projection that is visible for the oncoming traffic on a lane.

According to a further embodiment, the visual marker is produced by at least one light source of the vehicle on the opposite lane. The signaling device can thereby be designed as a headlight or as a light source of the vehicle that is already present. By way of example, one or a plurality of matrix lights and the like can be used to produce the visual marker. The visual marker for the oncoming traffic can encourage the road users to behave cooperatively. A marker of this type can enable the vehicle, in particular in the case of a high volume of traffic, to continue its journey quickly and safely.

BRIEF DESCRIPTION OF THE DRAWINGS

Preferred exemplary embodiments of the disclosure are outlined in more detail below based on highly simplified schematic illustrations, in which.

DETAILED DESCRIPTION

Figure 1:
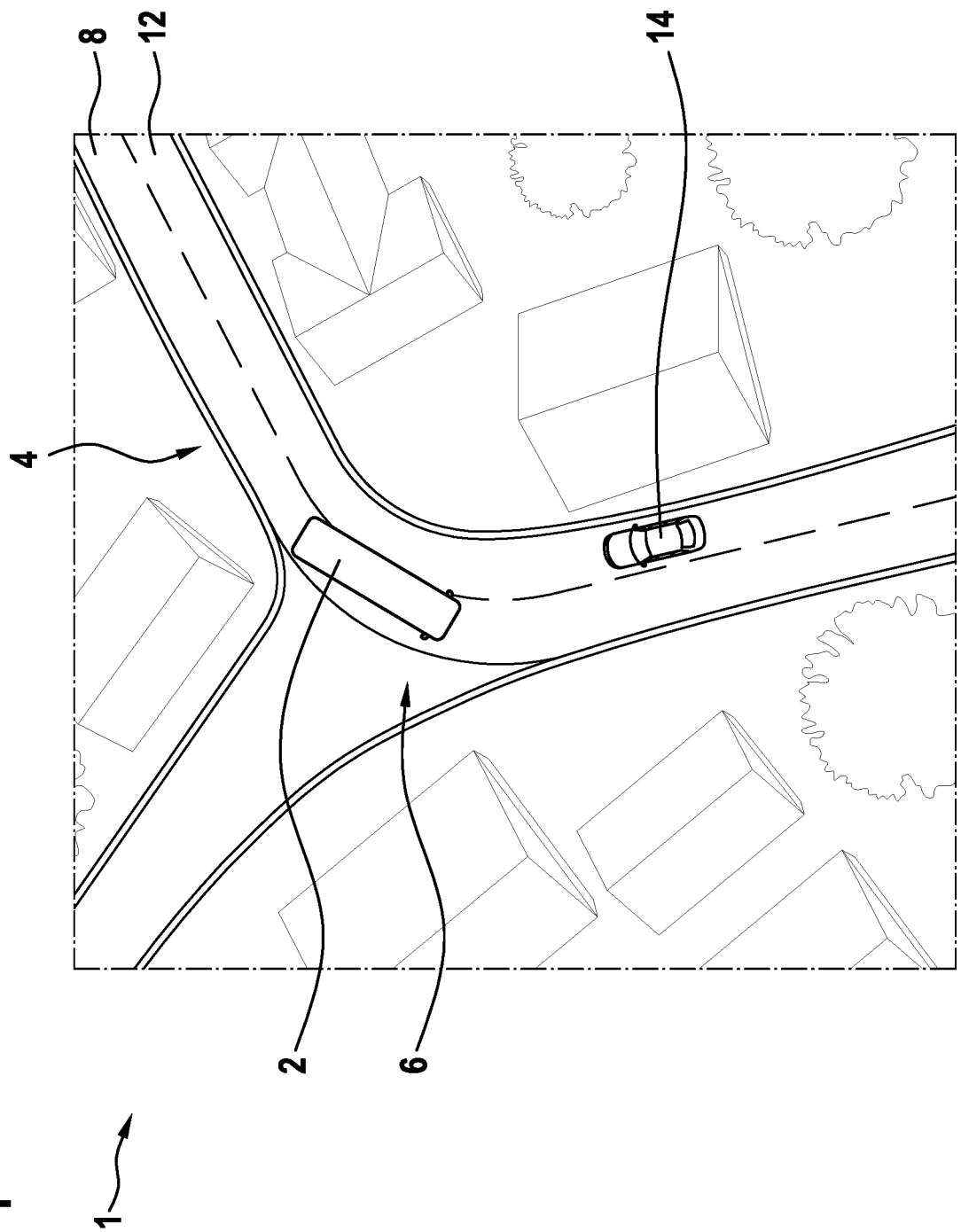
FIG. 1 shows a schematic plan view of a section of road.

FIG. 1 illustrates a section of road 1 in a schematic plan view. A vehicle 2 drives on the road 4 and follows the course of the road 4. For this purpose, the vehicle 2 has to drive round a bend 6.

According to the exemplary embodiment, the vehicle 2 is configured as an automated bus. Owing to the dimensions of the vehicle 2, the vehicle 2 does not remain in its lane 8 or on its road when driving round the bend 6, but rather will have to cut across a region 10 of an opposite lane 12 when continuing its journey. This is shown in more detail in FIGS. 2 and 3.

In particular in the case of a road user 14 with right of way in the oncoming traffic approaching during the cutting across, such a situation can lead to gridlock which is complicated to relieve or else dangerous driving conditions.

Figure 2:
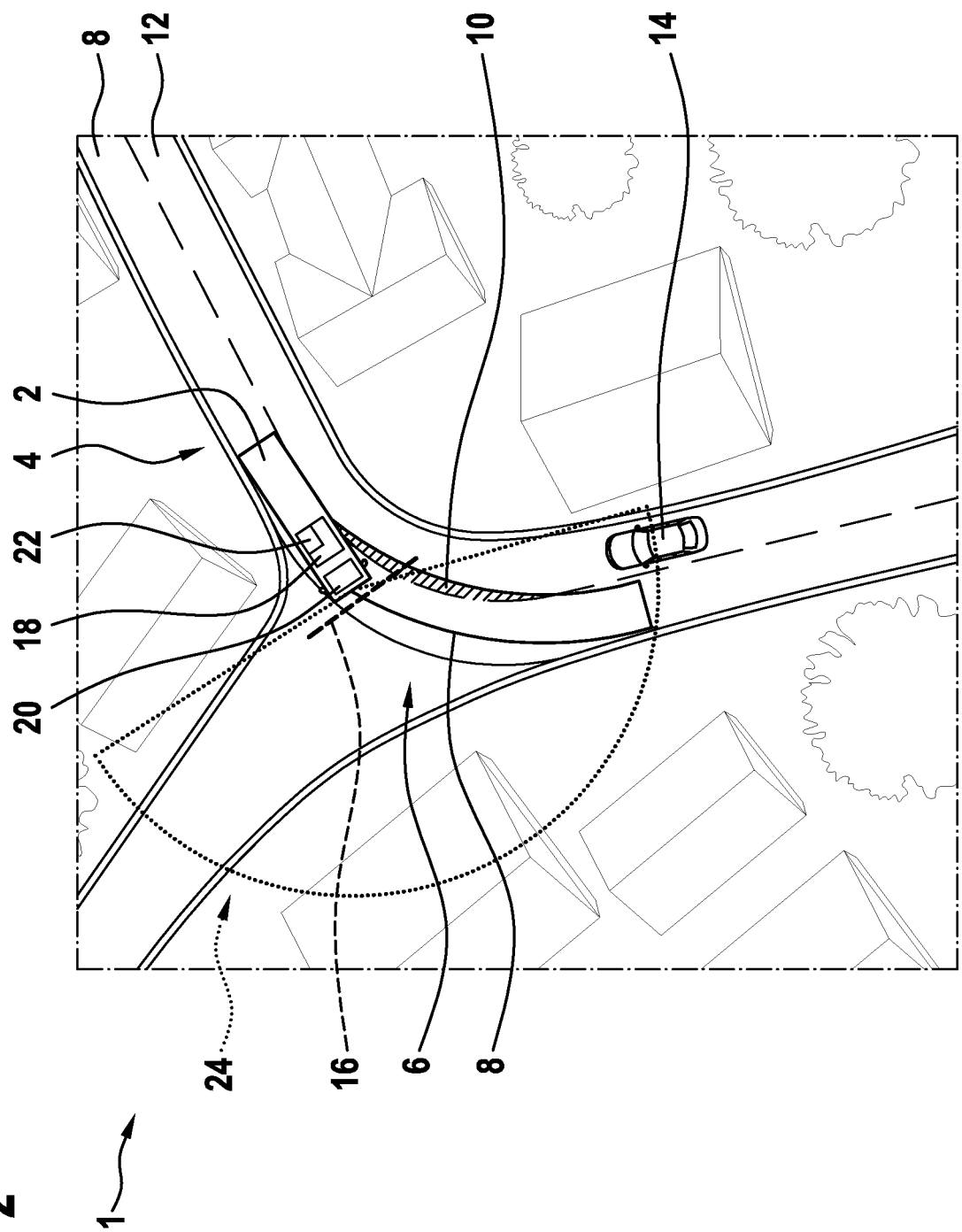
FIG. 2 shows a schematic plan view of a section of road with a vehicle at a stop position.

FIG. 2 shows a schematic plan view of the section of road 1 illustrated in FIG. 1 with the vehicle 1, which stops at a stop position 16 or drives at a reduced speed.

In this connection, the method is illustrated according to an embodiment. The vehicle 1 has a control device 18 which is designed to carry out the method. For this purpose, the control device 18 is connected to a surroundings sensor system 20 and a machine-readable storage 22 such that data are carried.

The surroundings sensor system 20 can have one or a plurality of sensors. In particular, the surroundings sensor system 20 can have camera sensors, LIDAR sensors, radar sensors and the like. The scanning region 24 of the surroundings sensor system 20 is illustrated by way of example. The surroundings sensor system 20 can collect measurement data of the scanning region 24 and forward them to the control device 18. The control device 18 can evaluate the received measurement data and carry out the method described in FIG. 4.

The vehicle 2 slows down as it approaches the intersection and/or the bend 6 in such a manner that even before driving over the region 10 of the opposite lane 12, a comfortable stop can be performed. The corresponding stop line or stop position 16 is indicated schematically.

Furthermore, the surroundings sensor system 20 monitors the road 4 for approaching vehicles 14. If, within a distance that is sufficient in time for the vehicle 2 to comfortably drive through the region 10 of the opposite lane 12, no oncoming traffic 14 takes up the opposite lane 12, the maneuver of the vehicle 2 driving round the bend 6 can be started.

Figure 3:
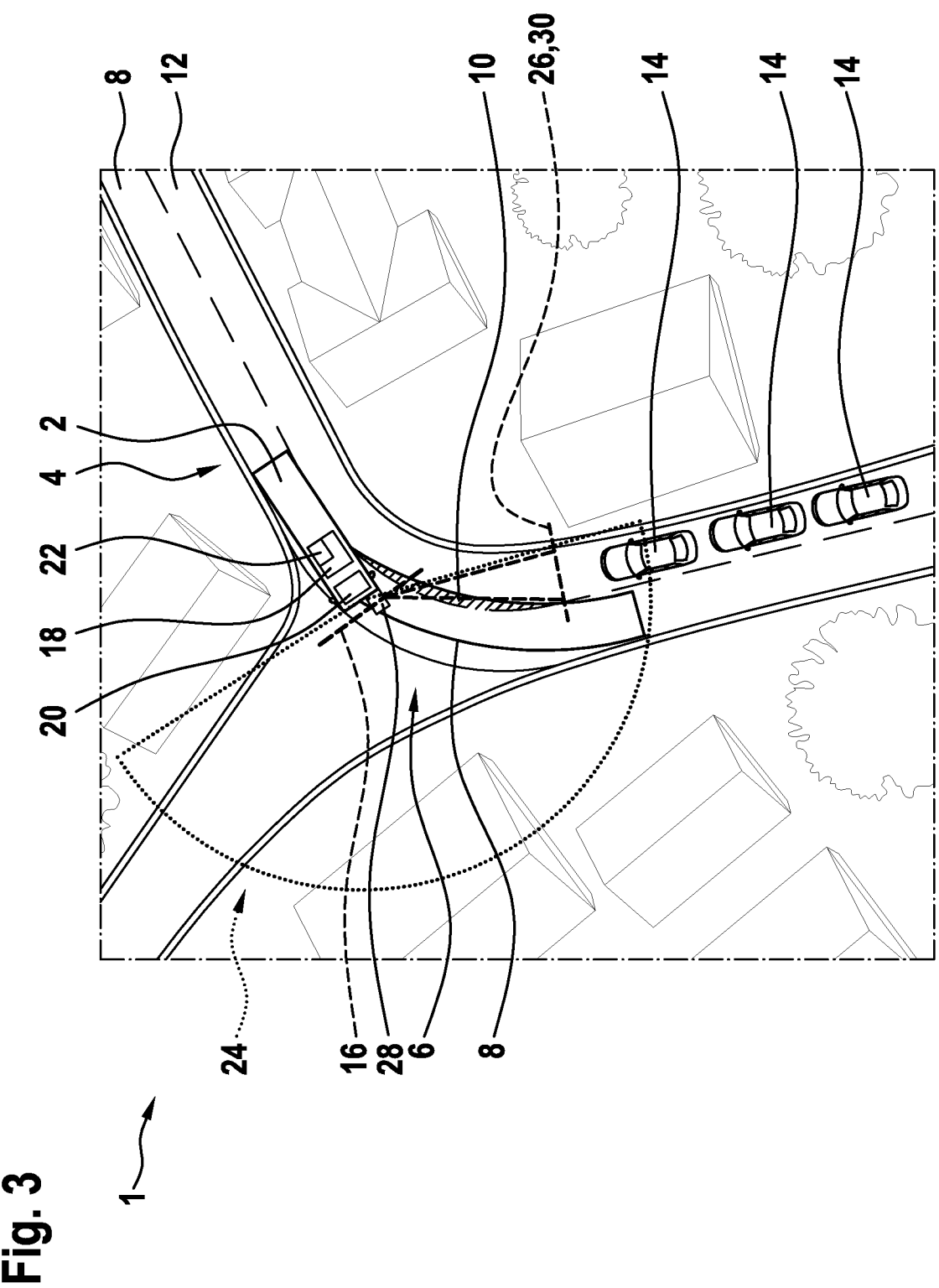
FIG. 3 shows a schematic plan view of a section of road with a stop position projected by the vehicle for the oncoming traffic and FIG. 4 shows a schematic flowchart of a method according to an embodiment.

FIG. 3 shows a schematic plan view of the section of road 1 with a stop position 26 produced by the vehicle 2 for the oncoming traffic 14. This represents an alternative or an addition to the course of the vehicle 2 shown in FIG. 2.

The oncoming traffic 14 can thereby be instructed to refrain from driving round the bend 6, as the vehicle 2 at least partially requires the opposite lane 12. The vehicle 2 has a signaling device 28 for producing a projection 30. The signaling device 28 can preferably produce a projection 30 that is visible for the oncoming traffic 14 on a lane 8, 12. The signaling device 28 is likewise connected to the control device 18 and can be controlled and regulated by the control device 28.

The signaling device 28 is integrated in a headlight of the vehicle 2 according to the exemplary embodiment. The projection 30 is intended as a stop line 26 for the oncoming traffic 14. Retrofitting the infrastructure, such as putting up traffic lights, can thereby be dispensed with, as the signaling is carried out by the vehicles 2.

A projection 30 of this type can also be produced when leaving a stop or during a maneuver, in order to be able to drive on the opposite lane 12 safely.

Figure 4:
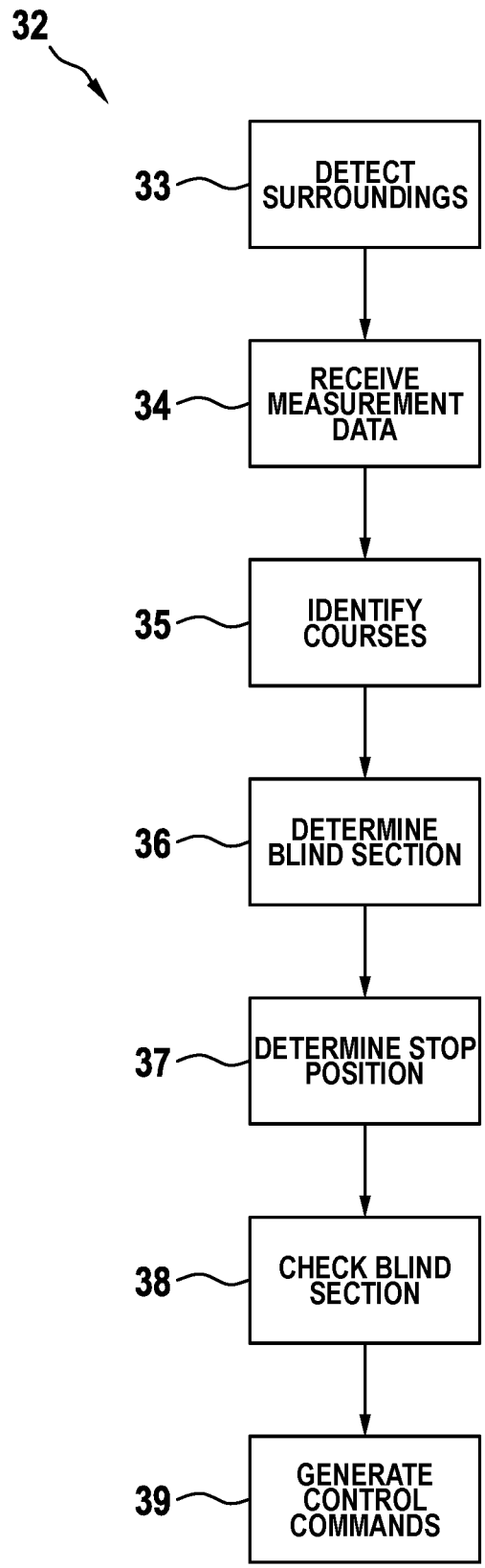

FIG. 4 shows a schematic flowchart of a method 32 according to an embodiment. The method 32 can preferably be carried out by a control device 18, which has an influence on a vehicle control system of a vehicle 2.

The method 32 is intended to prevent gridlock in blind sections of road 1, in particular when the vehicle 2 cuts across an opposite lane 12. The surroundings 24 of the vehicle 2 are detected 33 by the surroundings sensor system 20. The measurement data of the surroundings sensor system 20 are received 34 by the control device 18.

The control device 18 can identify 35 courses of road and other road users 14 in the surroundings 24 of the vehicle 2 based on the received measurement data.

In one step, the blind section of road 1 can be determined 36 by the control device 18.

Prior to entering the blind section of road 1, a stop position 16 of the vehicle 2 is determined 37 and it is checked 38 whether the blind section of road can be driven on unobstructed.

The control device 18 can stop the vehicle 2 at the stop position 16 or at least slow it down.

According to the exemplary embodiment, oncoming road users 14 are identified at a sufficient distance from the bend 6, as a result of which the vehicle 2 can drive round the bend unobstructed. The control device 18 can generate corresponding control commands for initiating further travel 39.

What is claimed is:

1. A method for driving a vehicle on an opposite lane in a controlled manner, comprising:
   detecting, with a surroundings sensor system, surroundings of the vehicle;
   receiving, with a control device, measurement data of the surroundings sensor system;
   identifying, with the control device, at least one course of a road, and at least one course of at least one road user in the surroundings based on the received measurement data;
   planning, with the control device, a trajectory of the vehicle within the at least one course of a road to continue traveling in a first lane on the course of the road;
   identifying, with the control device, a section of the road along the trajectory at which driving the vehicle in the first lane on the section of road causes the vehicle to partially travel in the opposite lane;
   determining, with the control device, a first stop position for the vehicle prior to entering the identified section of road;
   stopping or slowing down the vehicle, with the control device, at or before the first stop position;
   checking, with the control device, whether the opposite lane can be driven on in the identified section by evaluating the measurement data while the vehicle is stopping or slowing down; and
   upon determining that the opposite lane can be driven on, operating the vehicle to drive partially in the opposing lane and then to continue driving along the trajectory in the first lane.

2. The method according to claim 1, further comprising:
   determining a necessary period of time for the vehicle to drive through the identified section of road.

3. The method according to claim 2, wherein checking whether the opposite lane can be driven on comprises:
   checking whether the opposite lane can be driven on during the necessary period of time to drive through the section of road based upon the identified at least one course of at least one road user.

4. The method according to claim 3, further comprising:
   initiating driving on the section of road when the at least one road user is not driving on the section of road during the necessary period of time, wherein the vehicle partially enters the opposite lane along a region when driving on the section of road.

5. The method according to claim 1, further comprising:
   determining a second stop position for the at least one road user, the second stop position being is outside the section of road on an opposite end of the section of road from the vehicle.

6. A method for driving a vehicle on an opposite lane in a controlled manner, comprising:
   detecting, with a surroundings sensor system, surroundings of the vehicle;
   receiving, with a control device, measurement data of the surroundings sensor system;
   identifying, with the control device, at least one course of a road, and at least one course of at least one road user in the surroundings based on the received measurement data;
   planning, with the control device, a trajectory of the vehicle within the at least one course of a road to continue traveling in a first lane on the course of the road;
   identifying, with the control device, a section of the road at which driving the vehicle in the first lane on the section of road causes the vehicle to partially travel in the opposite lane;
   determining, with the control device, a first stop position for the vehicle prior to entering the identified section of road;
   checking, with the control device, whether the opposite lane can be driven on in the identified section;
   determining, with the control device, a second stop position for the at least one road user, the second stop position being outside the section of road on an opposite end of the section of road from the vehicle; and
   indicating, with the control device, the second stop position to the at least one road user.

7. The method according to claim 6, further comprising:
   stopping or slowing down the vehicle at or before the first stop position, wherein:
   checking whether the opposite lane can be driven on in the identified section includes checking the identified section for the at least one road user by evaluating the measurement data while the vehicle is stopping or slowing down.

8. The method according to claim 6, wherein indicating to the at least one road user the second stop position comprises:
indicating to the at least one road user the second stop position using a visual marker.

9. The method according to claim 8, wherein indicating to the at least one road user the second stop position using the visual marker further comprises:
operating a light source of the vehicle to project the visual marker onto the opposite lane.

10. A vehicle system for a vehicle driving on an opposite lane in a controlled manner, comprising:
a surroundings sensor system configured to detecting surroundings of the vehicle; and
a control device operably connected to the surroundings sensor system and configured to check whether the opposite lane can be driven on by
receiving measurement data of the surroundings sensor system,
identifying at least one course of a road, and at least one course of at least one road user in the surroundings based on the received measurement data,
planning a trajectory of the vehicle within the at least one course of a road to continue traveling in a first lane on the course of the road,
identifying a section of the road at which driving the vehicle in the first lane on the section of road causes the vehicle to partially travel in the opposite lane,
determining a first stop position for the vehicle prior to entering the identified section of road,
stopping or slowing down the vehicle at or before the first stop position,
checking whether the opposite lane can be driven on in the identified section by evaluating the measurement data while the vehicle is stopping or slowing down, and
upon determining that the opposite lane can be driven on, operating the vehicle to drive partially in the opposing lane and then to continue driving along the trajectory in the first lane.

11. The system of claim 10, further comprising:
a machine-readable storage medium operably connected to the control device and including commands stored therein, wherein the control device is configured to execute the commands to check whether the opposite lane can be driven on.

12. The system of claim 11, wherein the control device is further configured to execute the commands to:
determine a second stop position for the at least one road user, the second stop position being is outside the section of road on an opposite end of the section of road from the vehicle.

13. The method according to claim 1, further comprising:
determining a necessary period of time for the vehicle to cut across the opposite lane within the section of road.

* * * * *